(12) United States Patent
Driesen et al.

(10) Patent No.: US 9,471,659 B2
(45) Date of Patent: Oct. 18, 2016

(54) PROVIDING CONTINUOUS DATABASE ACCESS DURING DATABASE MODIFICATION

(71) Applicants: Volker Driesen, Heidelberg (DE); Nicolai Jordt, Bad Langbrücken (DE); Martin Mayer, Heidelberg (DE); Wieland Hoprich, Mannheim (DE); Andrey Engelko, Karlsruhe (DE); Steffen Meissner, Heidelberg (DE); Peter Schreiber, Wiesloch (DE); Levke Bentzien, Heidelberg (DE)

(72) Inventors: Volker Driesen, Heidelberg (DE); Nicolai Jordt, Bad Langbrücken (DE); Martin Mayer, Heidelberg (DE); Wieland Hoprich, Mannheim (DE); Andrey Engelko, Karlsruhe (DE); Steffen Meissner, Heidelberg (DE); Peter Schreiber, Wiesloch (DE); Levke Bentzien, Heidelberg (DE)

(73) Assignee: SAP SE, Walldorf (DE)

( * ) Notice: Subject to any disclaimer, the term of this patent is extended or adjusted under 35 U.S.C. 154(b) by 148 days.

(21) Appl. No.: 13/730,756

(22) Filed: Dec. 28, 2012

(65) Prior Publication Data
US 2013/0238577 A1 Sep. 12, 2013

Related U.S. Application Data

(60) Provisional application No. 61/607,545, filed on Mar. 6, 2012.

(51) Int. Cl.
*G06F 12/16* (2006.01)
*G06F 17/30* (2006.01)

(52) U.S. Cl.
CPC ......... *G06F 17/30578* (2013.01); *G06F 12/16* (2013.01); *G06F 17/303* (2013.01); *G06F 17/30091* (2013.01)

(58) Field of Classification Search
CPC ................ G06F 17/30575; G06F 17/30595; G06F 17/30566; G06F 17/30489; G06F 21/6218
USPC ....... 707/812, 792, 687, 638, 695, 635, 637, 707/658
See application file for complete search history.

(56) References Cited

U.S. PATENT DOCUMENTS

| | | | |
|---|---|---|---|
| 6,779,118 B1 * | 8/2004 | Ikudome et al. | 726/7 |
| 2003/0041093 A1 * | 2/2003 | Yamane | G06F 11/0709 709/201 |
| 2003/0135478 A1 * | 7/2003 | Marshall et al. | 707/1 |
| 2008/0098046 A1 * | 4/2008 | Alpern et al. | 707/203 |
| 2010/0088281 A1 * | 4/2010 | Driesen et al. | 707/641 |
| 2011/0246419 A1 * | 10/2011 | Yancey et al. | 707/624 |

* cited by examiner

*Primary Examiner* — Robert Beausoliel, Jr.
*Assistant Examiner* — Pedro J Santos
(74) *Attorney, Agent, or Firm* — Mintz Levin Cohn Ferris Glovsky and Popeo, P.C.

(57) ABSTRACT

The subject matter described herein relates to providing a continuous access to a database at times, including when the database is being modified or upgraded. Initially, access to an old version of a table is enabled and provided to a user. A copy of the old version is generated. Access is asynchronously redirected from the old version to the copy of the old version. A new version of the table is generated by modifying the structure of the first version of the table. The copy of the old version is accessible when the database is being modified or upgraded. When the structure is being modified, access is asynchronously redirected from the copy of the old version to the new version.

23 Claims, 5 Drawing Sheets

PROVIDING CONTINUOUS DATABASE ACCESS DURING DATABASE MODIFICATION

RELATED APPLICATION

This application claims priority under 35 U.S.C. §119 to U.S. Provisional Application Ser. No. 61/607,545, filed Mar. 6, 2012, entitled "TRUE ZERO DOWNTIME," the disclosures of which are hereby fully incorporated by reference.

TECHNICAL FIELD

The subject matter described herein relates to enabling and providing a continuous access of a database and associated data to a user at times, including when the database is being modified or upgraded.

BACKGROUND

Some business entities (for example, companies that make enterprise software to manage business operations and customer relations) provide access of a database to their customers. The database can be accessed by using an application software, also referred to herein as an application. When the database needs to be modified or updated, the database can become inaccessible for a significantly long downtime (for example, several hours) when the database is being modified or upgraded. Moreover, all the users accessing the database may be synchronously logged out for the upgrade to occur. Such inaccessibility during a long downtime and the synchronous unplanned logout of the customers can be inconvenient for the customers, and may result in a loss of revenue and/or loss in profits for the business entities.

SUMMARY

In some implementations, methods and apparatus, including computer program products, and related systems are disclosed for enabling and providing a continuous access of a database to at least one user when the database is being modified or upgraded. The users of the database that are accessing an old version of the database may log-out asynchronously, and then re-log-in to access the updated version of the database.

In some implementations, computer program products are provided that comprise non-transitory computer readable media storing instructions, which when executed by at least one data processors of one or more computing systems, causes at least one data processor to perform operations. These operations may include enabling at least one of a read access and a write access to a first version of a table; generating a copy of the first version of the table, a structure of the copy of the first version of the table being same as a structure of the first version of the table; redirecting, on a first user-by-user basis, access from the first version of the table to the copy of the table; generating a second version of the table by modifying the structure of the first version of the table, the copy of the first version of the table being accessible when the updating is being performed; redirecting, when the structure is being modified and on a second user-by-user basis, access from the copy of the first version of the table to the second version of the table.

The above methods, apparatus, and computer program products may, in some implementations, further include one or more of the following features.

In some implementations, the table may be a database.

In some implementations, the redirecting of the access from the first version of the table to the copy of the table may include performing a first set of one or more changes in the copy of the first version of the table in response to the first set of one or more changes directly performed in the first version of the table; and preventing performing of a second set of one or more changes in the first version of the table in response to the second set of one or more changes directly performed in the copy of the first version of the table. In some implementations, the first set of one or more changes may include at least one of: direct insertions of data, direct updates of data, and direct deletions of data that are performed in the first version of the table. In some implementations, the second set of one or more changes may include at least one of: direct insertions of data, direct updates of data, and direct deletions of data that are performed in the copy of the first version of the table. In some implementations, the preventing may be performed by at least one semantic lock.

In other implementations, the first user-by-user basis may characterize a provision of continuous access for each user to the first version of the table until re-authentication information is received from a user to access the table. In some implementations, the re-authentication may be received based on a desire of the user. In yet other implementations, access to the copy of the first version of the table may be enabled and provided to the user after the re-authentication information is received from the user.

In some implementations, the redirecting of the access from the copy of the first version of the table to the second version of the table may include performing a third set of one or more changes in the second version of the table in response to the third set of one or more changes directly performed in the copy of the first version of the table; and preventing performing of a fourth set of one or more changes in the copy of the first version of the table in response to the fourth set of one or more changes directly performed in the second version of the table. In some implementation, the third set of one or more changes may include at least one of: direct insertions of data, direct updates of data, and direct deletions of data that are performed in the copy of the first version of the table. In some implementations, the fourth set of one or more changes may include at least one of: direct insertions of data, direct updates of data, and direct deletions of data that are performed in the second version of the table. In other implementations, the preventing may be performed by at least one semantic lock.

In some implementations, the second user-by-user basis may characterize a provision of continuous access for each user to the copy of the first version of the table until re-authentication information is received from a user to access the table. In some implementations, the re-authentication may be received based on a desire of the user. In some implementations, access to the second version of the table may be enabled and provided to the user after the re-authentication information is received from the user.

In some implementations, the operations may also include deleting the copy of the first version of the table after all users have been redirected from the copy of the first version of the table to the second version of the table.

In some implementations, the operations may also include deleting the first version of the table after all users have been redirected from the copy of the first version of the table to the second version of the table.

In some implementations, the first version of the table, the copy of the first version of the table, and the second version of the table may be configured to be accessed via the Internet.

In some implementations, the table may be provided on a server computer that is accessed over a communication network by a plurality of client computers in a client-server architecture. In some implementations, each client computer may be operated by one or more users.

In some implementations, there is a method for enabling, using at least one processor, at least one of a read access and a write access to a first version of a database; generating, using at least one processor, a copy of the first version of the database, a structure of the copy of the first version of the database being same as a structure of the first version of the database; asynchronously redirecting, using at least one processor, access from the first version of the database to the copy of the database; generating, using at least one processor, a second version of the database by modifying the structure of the first version of the database, the copy of the first version of the database being accessible when the updating is being performed; and asynchronously redirecting, using at least one processor and when the structure is being modified, access from the copy of the first version of the database to the second version of the database.

In some implementations, the first version may be an old version, and the second version may be a new version.

In some implementations, the redirecting of the access from the first version of the table to the copy of the table may include performing, using at least one processor, a first set of one or more changes in the copy of the first version of the table in response to the first set of one or more changes directly performed in the first version of the table; and preventing, using at least one processor, performing of a second set of one or more changes in the first version of the table in response to the second set of one or more changes directly performed in the copy of the first version of the table.

In some implementations, the redirecting of the access from the copy of the first version of the table to the second version of the table may include performing, using at least one processor, a third set of one or more changes in the second version of the table in response to the third set of one or more changes directly performed in the copy of the first version of the table; and preventing, using at least one processor, performing of a fourth set of one or more changes in the copy of the first version of the table in response to the fourth set of one or more changes directly performed in the second version of the table.

In some implementations, the method may also include deleting, using at least one processor, the copy of the first version of the table after a plurality of users have been redirected from the copy of the first version of the table to the second version of the table; and deleting, using at least one processor, the first version of the table after the plurality of users have been redirected from the copy of the first version of the table to the second version of the table.

Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, the database continuously remains accessible during a downtime of the database, and the users are allowed to log-out asynchronously when the upgrade of the database is available. Such a continuous accessibility during the downtime can be cost-efficient and time-efficient for the users of the application and the database. Moreover, because the users are allowed to log-out asynchronously (that is, independent of the availability of upgrade and of the log-out of other users), the users can obviate any inconvenience due to a forcible log-out, thereby resulting in loyalty amongst the users. Such a user-satisfaction can result in increased profits and revenue for at least those users and the business entity that provides the database.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
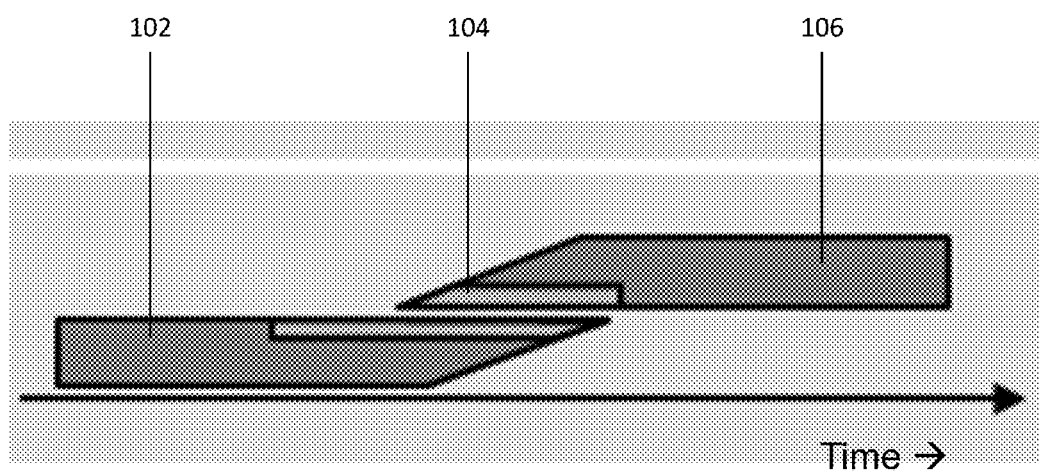
FIG. 1 is a diagram illustrating a timeline for enabling and providing a continuous access of data in a database.

FIG. 1 is a diagram 100 illustrating a timeline for enabling and providing a continuous access of data in a database.

The database is a structured/organized set of data, such as one or more tables. In some implementations, the database can be at least one of the following: a hierarchical database, a network database, a relational database, an object oriented database, and/or any other database. The hierarchical database can be organized in a hierarchical pyramid fashion, like the branches of a family tree extending downwards, wherein related fields or records can be grouped together so that there can be higher-level records and lower-level records. The network database can look like a cobweb or an interconnected network of records, wherein each child record can have more than one parent record. The relational databases can connect data in different tables by using common data elements or a key field in the tables.

In some implementations, the database is implemented at a server (for example, a server computer). Clients of the server have one or more users, which are provided access to the database. The users can query the database by inputting commands of a query programming language (for example, structured query language—SQL) on a graphical user interface implemented at the respective clients. The results of the query can also be displayed on the graphical user interface in at least one of: graphical format, numerical format, alphabetic format, alphanumeric format, or any other format. The clients and the server can be connected by a client-server architecture. The clients can be connected to the server via a communication network, such as the internet. Although internet has been described, other communication networks are also possible, such as an intranet, a local area network, a wide area network, a metropolitan area network, a Bluetooth network, an infrared network, a zigbee network, a telecommunication network, and other networks.

At 102, an access to a first version of the database is enabled and provided to a user of an application using the database. At 104, access to an upgraded/second version of the database is asynchronous provided to the user upon individual log-out. The user is not logged out synchronously and/or automatically. Instead, the user is allowed to log-off when the user individually desires, and the upgrade occurs when the user re-logs-on individually and independent of other users of the application using the database. During the upgrade, a continuous selective access to the database is enabled and provided to the user. At 106, access to the upgraded/second version of the application is enabled and provided to the user. The enabling and providing, as noted herein, can be a single functional step in some implementations, and can be two or more functional steps in other implementations.

In some alternate implementations, the user may not be required to re-logon to access the upgraded application, but the upgrade may need to be reloaded into the database.

Continuous or uninterrupted access to the functionality of the application is important in various industries, such as financial services, accounting, customer services, service providers, and/or other industries.

The term "user," as noted herein, can mean one or more of: customers, clients, entities, business units (for example, corporations, partnerships, and other units), groups of people, individuals, and the like.

Figure 2:
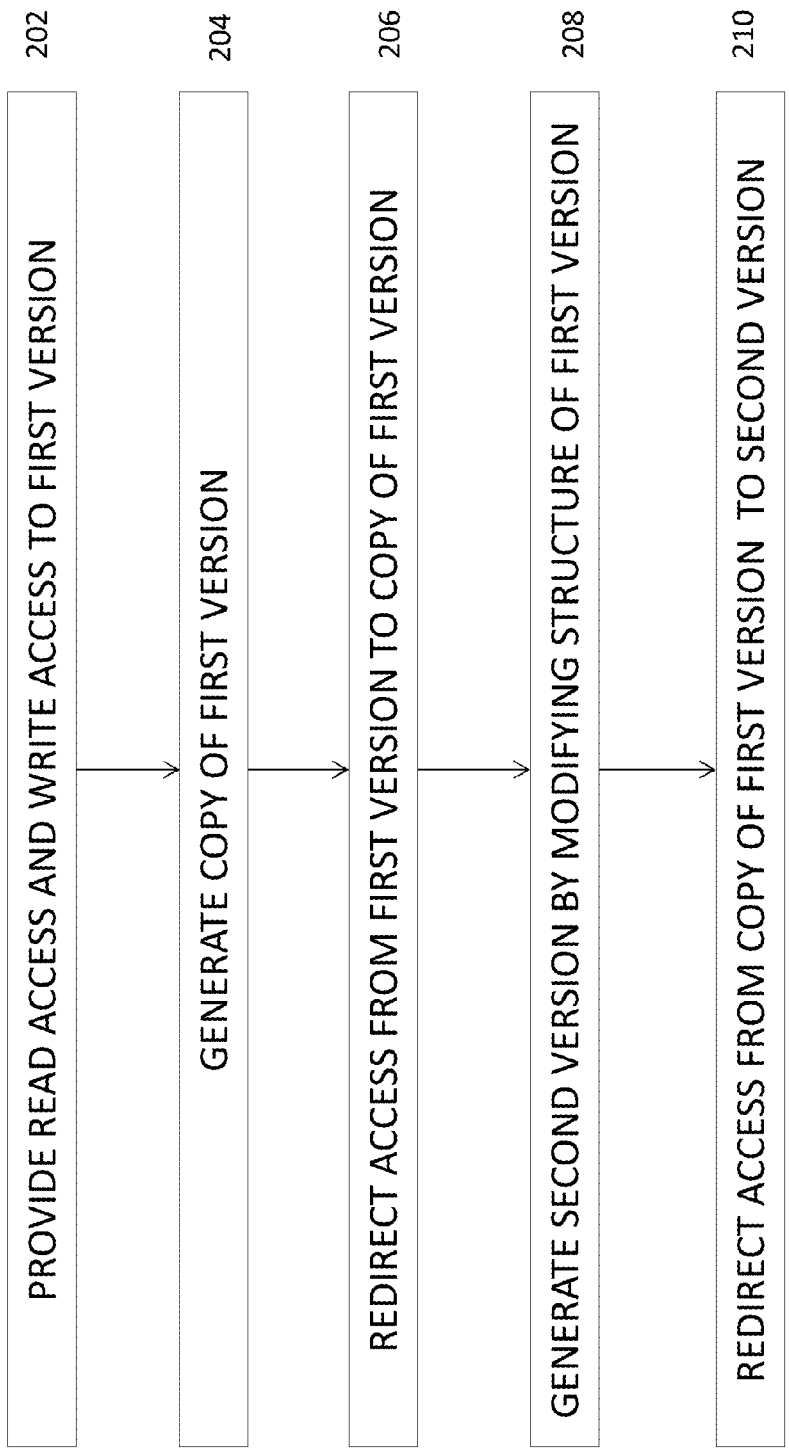
FIG. 2 is a flow diagram illustrating a method of enabling and providing a continuous access of a database during a modification of the database.

FIG. 2 is a flow diagram illustrating a method 200 of enabling and providing a continuous access of a database during a modification (for example, an upgrade) of the database.

At 202, at least one of a read access and a write access to a first version of a table is enabled and provided to a user of an application using the database. The table is a database, such as one of the databases noted above.

At 204, a copy of the first version of the table is generated. A structure of the copy of the table is the same as a structure of the first version of the table.

At 206, access is redirected from the first version of the table to the copy of the table. The redirecting of the access occurs on a first user-by-user basis. During this redirecting, a first set of one or more changes are performed in the copy of the first version of the table in response to the first set of one or more changes directly performed in the first version of the table. The first set of one or more changes include at least one of: direct insertions of data, direct updates of data, and direct deletions of data that are performed in the first version of the table. The first set of changes can be performed using a procedural programming code, such as database triggers.

Further, during the redirecting, a second set of one or more changes are prevented from being performed in the first version of the table in response to the second set of one or more changes directly performed in the copy of the first version of the table. The second set of one or more changes include at least one of: direct insertions of data, direct updates of data, and direct deletions of data that are performed in the copy of the first version of the table. The first set of changes can be performed using a procedural programming code, such as database triggers.

The above-mentioned preventing of making the second set of one or more changes is performed by a locking mechanism, such as at least one semantic lock. Although the lock has been described as a semantic lock, in some other implementations, the lock can be a numeric lock, an alphanumeric lock, a digital lock, or any other lock.

The first user-by-user basis characterizes that the user is not logged out synchronously and/or automatically with a log out of other users of the application using the database. Instead, the user is allowed to log-off when the user desires, and the upgrade of the database occurs when each user re-logs-on individually and independent of the other users. A continuous access to the first version of the table is enabled and provided to the user until re-authentication information is received from the user to access the table. Access to the copy of the first version of the table is enabled and provided to the user after the re-authentication information is received from the user.

At 208, a second version of the table is generated by modifying the structure of the first version of the table. Access to the copy of the first version of the table is enabled and provided to the user when the updating is performed.

At 210, when the structure is being updated and on a second user-by-user basis, access is redirected from the copy of the first version of the table to the second version of the table. The redirecting includes performing a third set of one or more changes in the second version of the table in response to the third set of one or more changes directly performed in the copy of the first version of the table. The third set of one or more changes includes at least one of: direct insertions of data, direct updates of data, and direct deletions of data that are performed in the copy of the first version of the table. The third set of changes can be performed using a procedural programming code, such as database triggers.

Further, the redirecting includes preventing performing of a fourth set of one or more changes in the copy of the first version of the table in response to the fourth set of one or more changes directly performed in the second version of the table. The fourth set of one or more changes includes at least one of: direct insertions of data, direct updates of data, and direct deletions of data that are performed in the second version of the table. The fourth set of changes can be performed using a procedural programming code, such as database triggers.

The above-noted preventing is performed by at least one lock, such as a semantic lock. Although the lock has been described as a semantic lock, in some other implementations, the lock can be a numeric lock, an alphanumeric lock, a digital lock, or any other lock.

The second user-by-user basis characterizes that the user is not logged out synchronously and/or automatically with a log out of other users of the application using the database. Instead, the user is allowed to log-off when the user desires, and the upgrade of the database occurs when each user re-logs-on individually and independent of other users. A continuous access to the copy of the first version of the table can be enabled and provided to the user until re-authentication information is received from the user to access the table. Access to the second version of the table can be enabled and provided after the re-authentication information is received from the user.

Further, the copy of the first version of the table is deleted after all users of the application using the database have been redirected from the copy of the first version of the table to the second version of the table. In some implementations, the first version of the table can also be deleted after all users have been redirected from the copy of the first version of the table to the second version of the table.

As noted above, the table is provided on a server computer that is accessed over a communication network by a plurality of client computers in a client-server architecture. Each client computer can be operated by one or more users. Access to the first version of the table, the copy of the first version of the table, and the second version of the table can be enabled and provided to those one or more users via a communication network, such as the internet.

Figure 3:
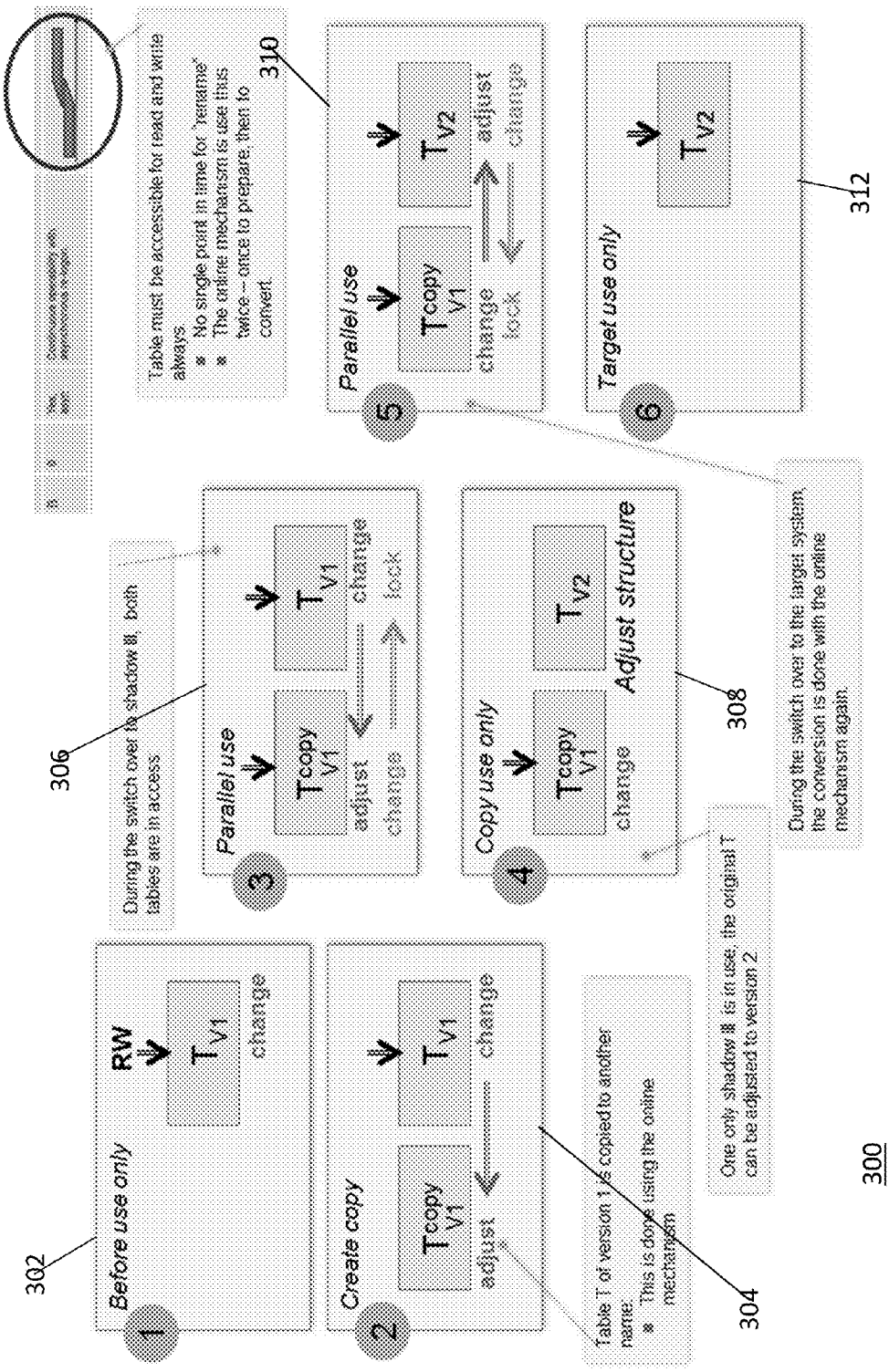
FIG. 3 is a diagram illustrating operations to enable and provide a continuous access to a database during a modification of the database.

FIG. 3 is a diagram 300 illustrating operations to enable and provide a continuous access to a database during a modification (for example, an upgrade) of the database.

At 302, read and write access to a first version of table $T_{v1}$ is enabled and provided to a user of an application using the database. Change of some of the data in the first version of the table $T_{v1}$ can be initiated.

At 304, a copy of the first version of the table $T_{copy\_v1}$ can be created. The copy of the first version of the table $T_{copy\_v1}$ can have a same structure and data as the structure and data of the first version of the table $T_{v1}$. The copy of the first version of the table $T_{copy\_v1}$ can have either a same name or a different name as the name of the first version of the table $T_{v1}$. When changes are made to some data in the first version of the table $T_{v1}$, corresponding changes can be made to the copy of the first version of the table $T_{copy\_v1}$.

At 306, the roll-over from the first version of the table $T_{v1}$ to the copy of the first version of the table $T_{copy\_v1}$ is performed. A read access and a write access to both the first version of the table $T_{v1}$ and the copy of the first version of the table $T_{copy\_v1}$ is enabled and provided to the user. As noted above, when changes are made to some data in the first version of the table $T_{v1}$, corresponding changes are made to the copy of the first version of the table $T_{copy\_v1}$. However, when changes are made to some data in the copy of the first version of the table $T_{copy\_v1}$, corresponding changes are prevented from being made to the first version of the table $T_{v1}$. Such a preventing is caused by locking a write access to the first version of the table $T_{v1}$. This locking can be performed by implementing a semantic lock. When a user re-logs on, the user are provided data from the copy of the first version of the table $T_{copy\_v1}$, and not the first version of the table $T_{v1}$. Thus, all new log-ons can use the copy of the first version of the table $T_{copy\_v1}$.

Here, redirection from the first version of the table $T_{v1}$ to the copy of the first version of the table $T_{copy\_v1}$ is described to be based on a log-off when desired by the user. However, in some other implementations where transactions are involved, the user may not have any log-in information (for example, the user does not have log-in information for accessing the table), and the redirection can be performed based on completion of a current transaction. In such a case, the roll-over is limited to the duration of user transactions such that the user can use the copy of the first version of the table $T_{copy\_v1}$ once the transaction is complete and the user starts a new transaction.

When the user has either re-logged-in or finished current transactions, access to the copy of the first version of the table $T_{copy\_v1}$ is enabled and provided to the user, and access to the first version of the table $T_{v1}$ is prevented.

At 308, as access to the first version of the table $T_{v1}$ is not prevented, the structure of the first version of the table $T_{v1}$ is now modified to generate the second version of the table $T_{v1}$ while the access to the copy of the first version of the table $T_{copy\_v1}$ is continued to be enabled and provided to the user. Thus, the user has a continuous access to the data without being required to log out during the upgrade from the first version of the table $T_{v1}$ to the second version of the table $T_{v2}$. Changes to the copy of the first version of the table $T_{copy\_v1}$ are initiated.

At 310, the roll-over from the copy of the first version of the table $T_{copy\_v1}$ to the second version of the table $T_{v2}$ is performed. A read access and a write access to both the copy of the first version of the table $T_{copy\_v1}$ and the second version of the table $T_{v2}$ is enabled and provided to the user. When changes are made to some data in the copy of the first version of the table $T_{copy\_v1}$, corresponding changes can be made to the second version of the table $T_{v2}$. However, when changes are made to some data in the second version of the table $T_{v2}$, corresponding changes are prevented from being made to the copy of the first version of the table $T_{copy\_v1}$. Such a preventing is caused by locking a write access to the copy of the first version of the table $T_{copy\_v1}$. This locking is performed by implementing a semantic lock. When the user re-logs on, the user is provided data from the second version of the table $T_{v2}$, and not the copy of the first version of the table $T_{copy\_v1}$. Thus, access to the second version of the table $T_{copy\_v1}$ is enabled and provided to the user after receiving the new long-on data from the user.

Here, redirection from the copy of the first version of the table $T_{copy\_v1}$ to the second version of the table $T_{v2}$ is described to be based on a log-off when desired by the user. However, in some other implementations where transactions are involved, the user may not have any log-in information (for example, the user may not need to log-in to access the table), and the redirection can be performed based on completion of a current transaction. In such a case, the roll-over is limited to a duration of user transactions such that the user can use the second version of the table $T_{v2}$ once the transaction is complete and the user starts a new transaction. When all the users have either re-logged-in or finished their current transactions, access to the second version of the table $T_{v2}$ can be enabled and provided to all the users, and access to the copy of the first version of the table $T_{copy\_v1}$ can be prevented. Thus, a continuous access of data can be enabled and provided to the user without requiring the user to log out during the upgrade from the first version of the table $T_{v1}$ to the second version of the table $T_{v2}$.

At 312, access of the copy of the first version of the table $T_{copy\_v1}$ is prevented, and access to the second version of the table $T_{v2}$ is enabled and provided to the user. As the copy of the first version of the table $T_{copy\_v1}$ may no longer be required, the copy of the first version of the table $T_{copy\_v1}$ can be deleted at 312. Further, to save more memory space, the first version of the table $T_{v1}$ can also be deleted if the first version of the table $T_{v1}$ is no longer required.

Figure 4:
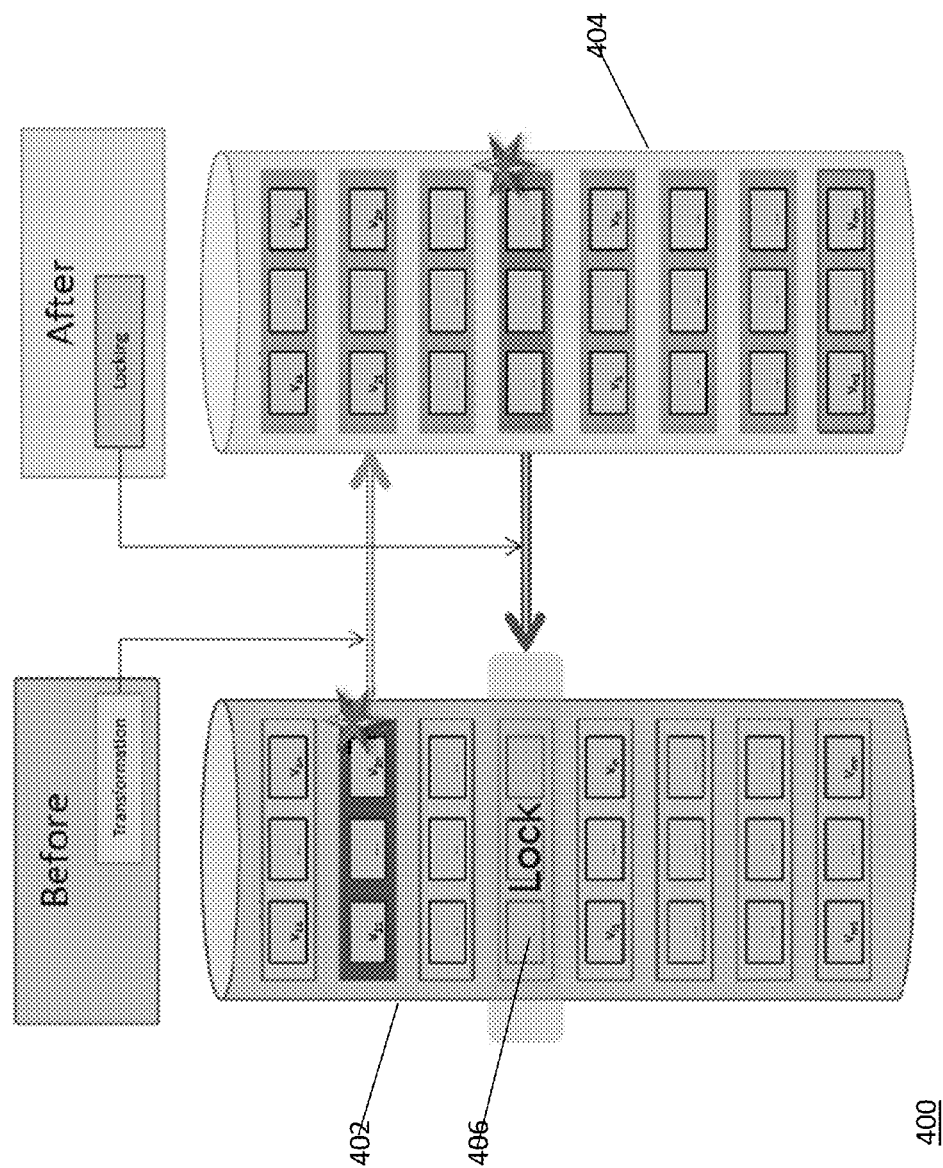
FIG. 4 is a diagram illustrating a version of a table before an upgrade and a version of the table after the upgrade.

FIG. 4 is a diagram 400 illustrating a version of a table before an upgrade 402 and a version of the table after the upgrade 404. The diagram 400 shows a phase where the version of the table after the upgrade 404 is accessible and the version of a table before an upgrade 402 is inaccessible. The phase of inaccessibility of the version 402 and accessibility of the version 404 is obtained by performing the following operations.

Initially, access to the version 402 is enabled and provided.

Subsequently, the version 404 is generated. In one implementation, the version 402 has a structure that is same as the structure of the version 404. In another implementation, the version 402 has a structure that is different from the structure of the version 404. While version 402 and version 404 have been described as having a single table each, in some other implementations, 402 and/or 404 can include one or more tables each.

Then, a transformation mechanism is implemented to transform from providing access to version 402 to providing access to version 404. The changes made to version 402 are performed in version 404 as well. The changes rolled-back (for example, not accepted) in version 402 are rolled-back (for example, not accepted) in version 404. A key range in version 402 is mapped to a corresponding key range in the version 404. This transformation is performed by using programming codes, such as database triggers. The performing of changes and/or rolling back of changes is performed in a batch by using a batch mechanism. That is, for computational simplicity, entire data in version 402 is copied, and then pasted in version 404 such that the transformation of changes occurs in a batch. Although a batch mechanism has been described, in some other implementations, other mechanisms are also possible, such as detecting individual positions of changed data in version 402, and making changes in corresponding positions in version 404.

As noted above, when a change is made at a position in version 402, a corresponding change in a corresponding position is made in version 404. However, when a change is made at a position in version 404, the change is prevented from being made in version 402. This preventing is facilitated by placing, in version 402, a lock 406 that can prevent writing data to the version 402. The lock 406 is a semantic lock. Although the lock 406 has been described as a semantic lock, in some other implementations, the lock 406 can be a numeric lock, an alphanumeric lock, a digital lock, or any other lock.

Once all transactions start using the version 404, the version 402 may not be necessary. If the version 402 is unnecessary, the version 402 is deleted.

Figure 5:
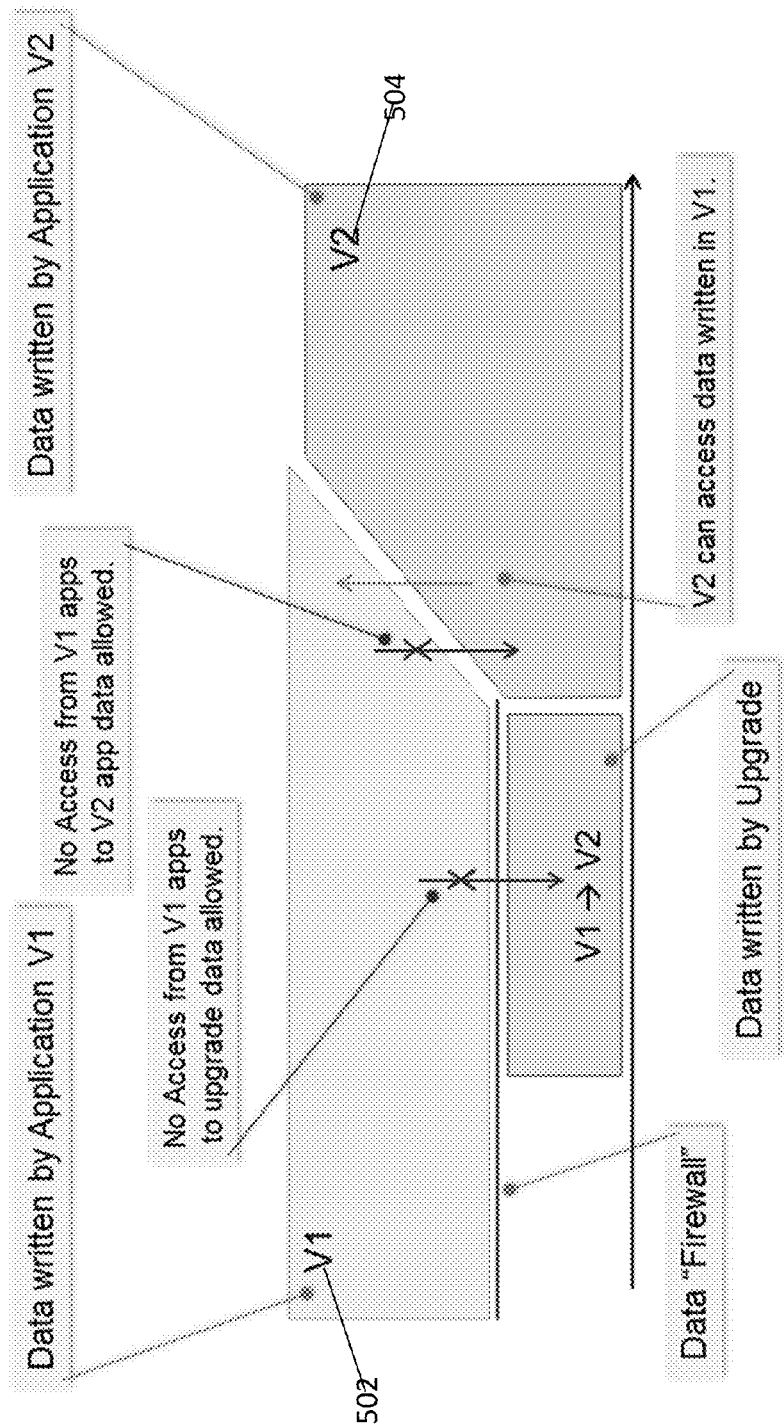
FIG. 5 is a diagram illustrating write access of a version of a table when some data is changed in another version.

FIG. 5 is a diagram 500 illustrating write access of a version of a table when some data is changed in another version. V1 502 can be a first version of a table and V2 504 can be a second (for example, new) version of the table. The second version 504 can have a structure that can be a modification/update of the structure of the first version 502.

As noted above, access (for example, read access and write access) to the database is enabled by allowing the database to be accessed by using a query programming language, such as structured query language (SQL). While SQL has been described to be used, other query programming languages can also be used. These other query programming languages include: .QL, contextual query language (CQL), CODASYL query language flat, concept oriented query language (COQL), multidimensional expressions (MDX), XQuery, and any other query programming language.

Various implementations of the subject matter described herein can be realized/implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can be have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (for example, magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, the subject matter described herein can be implemented on a computer that can display data to one or more users on a display device, such as a cathode ray tube (CRT) device, a liquid crystal display (LCD) monitor, a light emitting diode (LED) monitor, or any other display device. The computer can receive data from the one or more users via a keyboard, a mouse, a trackball, a joystick, or any other input device. To provide for interaction with the user, other devices can also be provided, such as devices operating based on user feedback, which can include sensory feedback, such as visual feedback, auditory feedback, tactile feedback, and any other feedback. The input from the user can be received in any form, such as acoustic input, speech input, tactile input, or any other input.

The subject matter described herein can be implemented in a computing system that can include at least one of a back-end component, a middleware component, a front-end component, and one or more combinations thereof. The back-end component can be a data server. The middleware component can be an application server. The front-end component can be a client computer having a graphical user interface or a web browser, through which a user can interact with an implementation of the subject matter described herein. The components of the system can be interconnected by any form or medium of digital data communication, such as a communication network. Examples of communication networks can include a local area network, a wide area network, internet, intranet, Bluetooth network, infrared network, or other networks.

The computing system can include clients and servers. A client and server can be generally remote from each other and can interact through a communication network. The relationship of client and server can arise by virtue of computer programs running on the respective computers and having a client-server relationship with each other.

Although a few variations have been described in detail above, other modifications can be possible. For example, the logic flows depicted in the accompanying figures and described herein do not require the particular order shown, or sequential order, to achieve desirable results. Other embodiments may be within the scope of the following claims.

What is claimed is:

1. A non-transitory computer program product storing instructions that, when executed by at least one programmable processor, cause the at least one programmable processor to perform operations comprising:
    enabling at least one of a read access and a write access to a first version of a table;
    generating a copy of the first version of the table, a structure of the copy of the first version of the table being same as a structure of the first version of the table;

redirecting, on a first user-by-user basis, access from the first version of the table to the copy of the first version of the table, the first user-by-user basis characterizing a provision of continuous access for a user to the first version of the table until a first transaction performed by the user is completed, the first user-by-user basis being associated with the completion of the first transaction when the user has not been assigned authentication information;

generating a second version of the table by modifying the structure of the first version of the table, the copy of the first version of the table being accessible when the updating is being performed; and redirecting, when the structure of the first version of the table is being modified and on a second user-by-user basis, access from the copy of the first version of the table to the second version of the table, the second user-by-user basis characterizing a provision of continuous access for the user to the copy of the first version of the table until a second transaction performed by the user is completed, the second user-by-user basis being associated with the completion of the second transaction when the user has not been assigned authentication information.

2. The computer program product of claim 1, wherein the table is a database.

3. The computer program product of claim 1, wherein the redirecting of the access from the first version of the table to the copy of the table comprises:

performing a first set of one or more changes in the copy of the first version of the table in response to the first set of one or more changes directly performed in the first version of the table; and preventing performing of a second set of one or more changes in the first version of the table in response to the second set of one or more changes directly performed in the copy of the first version of the table.

4. The computer program product of claim 3, wherein the first set of one or more changes includes at least one of: direct insertions of data, direct updates of data, and direct deletions of data that are performed in the first version of the table.

5. The computer program product of claim 3, wherein second set of one or more changes includes at least one of: direct insertions of data, direct updates of data, and direct deletions of data that are performed in the copy of the first version of the table.

6. The computer program product of claim 3, wherein the preventing is performed by at least one semantic lock.

7. The computer program product of claim 1, wherein the first user-by-user basis characterizes a provision of continuous access for each user to the first version of the table until re-authentication information is received from a user to access the table, the first user-by-user basis being associated with the re-authentication information when the user has been assigned authentication information, the re-authentication being received based on a desire of the user.

8. The computer program product of claim 7, wherein access to the copy of the first version of the table is enabled and provided to the user after the re-authentication information is received from the user.

9. The computer program product of claim 1, wherein redirecting of the access from the copy of the first version of the table to the second version of the table comprises:

performing a third set of one or more changes in the second version of the table in response to the third set of one or more changes directly performed in the copy of the first version of the table; and preventing performing of a fourth set of one or more changes in the copy of the first version of the table in response to the fourth set of one or more changes directly performed in the second version of the table.

10. The computer program product of claim 9, wherein the third set of one or more changes includes at least one of: direct insertions of data, direct updates of data, and direct deletions of data that are performed in the copy of the first version of the table.

11. The computer program product of claim 9, wherein the fourth set of one or more changes includes at least one of: direct insertions of data, direct updates of data, and direct deletions of data that are performed in the second version of the table.

12. The computer program product of claim 9, wherein the preventing is performed by at least one semantic lock.

13. The computer program product of claim 1, wherein the second user-by-user basis characterizes a provision of continuous access for each user to the copy of the first version of the table until re-authentication information is received from a user to access the table, the second user-by-user basis being associated with the re-authentication information when the user has been assigned authentication information, the re-authentication being received based on a desire of the user.

14. The computer program product of claim 13, wherein access to the second version of the table is enabled and provided to the user after the re-authentication information is received from the user.

15. The computer program product of claim 1, causing the at least one programmable processor to perform operations further comprising:

deleting the copy of the first version of the table after all users have been redirected from the copy of the first version of the table to the second version of the table.

16. The computer program product of claim 1, causing the at least one programmable processor to perform operations further comprising:

deleting the first version of the table after all users have been redirected from the copy of the first version of the table to the second version of the table.

17. The computer program product of claim 1, wherein the first version of the table, the copy of the first version of the table, and the second version of the table are configured to be accessed via internet.

18. The computer program product of claim 1, wherein the table is provided on a server computer that is accessed over a communication network by a plurality of client computers in a client-server architecture, each client computer being operated by one or more users.

19. A method comprising:

enabling, using at least one processor, at least one of a read access and a write access to a first version of a database;

generating, using at least one processor, a copy of the first version of the database, a structure of the copy of the first version of the database being same as a structure of the first version of the database;

asynchronously redirecting, using at least one processor and upon completion of a first transaction, access from the first version of the database to the copy of the first version of the database;

generating, using at least one processor, a second version of the database by modifying the structure of the first version of the database, the copy of the first version of the database being accessible when the updating is being performed; and asynchronously redirecting, using at least one processor and when the structure of the first version of the database is being modified and upon completion of a second transaction, access from the copy of the first version of the database to the second version of the database.

20. The method of claim 19, wherein the first version is an old version, and the second version is a new version.

21. The method of claim 19, wherein the redirecting of the access from the first version of the database to the copy of the first version of the database comprises:

performing, using at least one processor, a first set of one or more changes in the copy of the first version of the database in response to the first set of one or more changes directly performed in the first version of the database; and preventing, using at least one processor, performing of a second set of one or more changes in the first version of the database in response to the second set of one or more changes directly performed in the copy of the first version of the database.

22. The method of claim 21, wherein the redirecting of the access from the copy of the first version of the database to the second version of the database comprises:

performing, using at least one processor, a third set of one or more changes in the second version of the database in response to the third set of one or more changes directly performed in the copy of the first version of the database; and preventing, using at least one processor, performing of a fourth set of one or more changes in the copy of the first version of the database in response to the fourth set of one or more changes directly performed in the second version of the database.

23. The method of claim 19, further comprising:

deleting, using at least one processor, the copy of the first version of the database after a plurality of users have been redirected from the copy of the first version of the database to the second version of the database; and deleting, using at least one processor, the first version of the database after the plurality of users have been redirected from the copy of the first version of the database to the second version of the database.

* * * * *